(12) United States Patent
Thelander

(10) Patent No.: US 11,267,537 B2
(45) Date of Patent: Mar. 8, 2022

(54) PASSENGER BRIDGE COMPRISING A CABIN SUSPENSION

(71) Applicant: FMT INTERNATIONAL TRADE AB, Trelleborg (SE)

(72) Inventor: Per Thelander, Höllviken (SE)

(73) Assignee: FMT INTERNATIONAL TRADE AB, Malmö (SE)

( * ) Notice: Subject to any disclaimer, the term of this patent is extended or adjusted under 35 U.S.C. 154(b) by 42 days.

(21) Appl. No.: 16/765,314

(22) PCT Filed: Nov. 19, 2018

(86) PCT No.: PCT/SE2018/051196
§ 371 (c)(1),
(2) Date: May 19, 2020

(87) PCT Pub. No.: WO2019/098940
PCT Pub. Date: May 23, 2019

(65) Prior Publication Data
US 2020/0354026 A1  Nov. 12, 2020

(30) Foreign Application Priority Data

Nov. 20, 2017 (SE) .................................. 1751427-4

(51) Int. Cl.
*B64F 1/305* (2006.01)
*B63B 27/14* (2006.01)

(52) U.S. Cl.
CPC ............ *B63B 27/14* (2013.01); *B64F 1/3055* (2013.01); *B63B 2027/141* (2013.01)

(58) Field of Classification Search
CPC . E01D 1/00; E01D 15/10; B63B 27/14; B64F 1/305; B64F 1/3055
(Continued)

(56) References Cited

U.S. PATENT DOCUMENTS 4,572,550 A * 2/1986 Harder .................... B64F 1/362
14/71.5
5,004,188 A  4/1991 Donneky et al.
(Continued)

FOREIGN PATENT DOCUMENTS

| CN | 201604806 U | 10/2010 |
|---|---|---|
| CN | 202208360 U | 5/2012 |

(Continued)

OTHER PUBLICATIONS

International Search Report from Corresponding International Application No. PCT/SE2018/051196 dated Feb. 4, 2019.
(Continued)

*Primary Examiner* — Raymond W Addie
(74) *Attorney, Agent, or Firm* — Pearne & Gordon LLP

(57) ABSTRACT

A passenger bridge including a least one passenger bridge end segment; a bridge head, arranged at a distal end of said bridge end segment; a cabin, arranged to move about an outer periphery of the bridge head and comprising a door for passengers; and a cabin suspension, arranged to allow the cabin to rotate in relation to the bridge head about a vertical axis (A1). The application further relates to a cabin suspension including a pivot arm in journaled engagement with an upper part of the bridge head so that the cabin can swing in a first horizontal plane (P1), and in that a cabin holding part of the pivot arm is fastened to an upper part of the cabin, whereby the cabin hangs from the said cabin holding part.

9 Claims, 7 Drawing Sheets

(58) Field of Classification Search
USPC .................................................. 14/69.5–72.2
See application file for complete search history.

(56) References Cited

U.S. PATENT DOCUMENTS

| | | | |
|---|---|---|---|
| 5,084,936 A * | 2/1992 | Thomas, Jr. ............ | B64F 1/305 14/71.5 |
| 6,802,096 B2 | 10/2004 | Savage | |
| 9,682,750 B2 | 6/2017 | Thelander | |

FOREIGN PATENT DOCUMENTS

| ES | 2 334 631 A1 | 3/2010 |
|---|---|---|
| GB | 1139632 A | 1/1969 |
| SE | 1351035 A1 | 3/2015 |

OTHER PUBLICATIONS

Written Opinion from Corresponding International Application No. PCT/SE2018/051196 dated Feb. 4, 2019.
International Preliminary Report on Patentability from Corresponding International Application No. PCT/SE2018/051196 dated Oct. 7, 2019.
Supplementary European Search Report dated Nov. 12, 2020 for corresponding European Application No. EP 18 87 8500.

* cited by examiner

PASSENGER BRIDGE COMPRISING A CABIN SUSPENSION

FIELD OF THE INVENTION

The present invention relates to a passenger bridge, such as for a ship. In particular, the invention relates to a passenger bridge comprising a bridge head in turn comprising a cabin with a passenger entry/exit opening, and to a suspension of the cabin as suspended/supported on the bridge head.

BACKGROUND OF THE INVENTION

A bridge head is a structure arranged at a distal end of a passenger bridge segment, comprising a cabin which rotatingly engages with a main body of the bridge head, typically by being displaced along an outer periphery of the said main body, such as in a horizontal plane, which periphery may be semi-circular. Via the cabin, passengers can pass between the passenger bridge and a door opening in a ship or the like. Such bridge heads are known from, inter alia, SE 1351035-9.

The horizontal turnability of the cabin accomplishes that the cabin can be horizontally pivoted in relation to said distal end of the passenger bridge, to allow various angles between the passenger bridge and the said door opening.

Conventionally, such cabins are supported from under the cabin 160, for instance on a substantially circular platform protruding from a distal end of the bridge head. The cabin may be supported on wheels, so that it rolls on such a circular platform along its periphery, in effect rotating about a vertical axis near the circular platform's centre. This construction has proven robust and reliable, which is important since the passenger bridge must provide reliable and safe operation for prolonged time periods in all weathers, in particular on a quay where the weather may be particularly harsh in terms of moisture and wind.

However, there are still problems with this construction. The installation and maintenance are tedious and complex, since the wheels and other parts must be adjusted so that the cabin floor is level and properly aligned with the bridge head floor, and since peripheral equipment is often installed and access at an underside of the cabin, interfering with the support structure. Typically, the driving mechanism comprises a chain drive, which may malfunction. As a safety precaution, such chain drive is usually duplicated, so that the cabin position can be controlled even in case one of the chains breaks. Also, metal fatigue problems have been known to happen in parts of the supporting structure, due to the heavy weight of the cabin.

The present invention solves the above described problems.

BRIEF SUMMARY OF THE INVENTION

Hence, the invention relates to a passenger bridge comprising a passenger bridge end segment; a bridge head, arranged at a distal end of said bridge end segment; a cabin, arranged to move about an outer periphery of the bridge head and comprising a door for passengers; and a cabin suspension, arranged to allow the cabin to rotate in relation to the bridge head about a vertical axis, which passenger bridge is characterised in that the cabin suspension comprises a pivot arm in journaled engagement with an upper part of the bridge head so that the cabin can swing in a first horizontal plane, and in that a cabin holding part of the pivot arm is fastened to an upper part of the cabin, whereby the cabin hangs from the said cabin holding part.

BRIEF DESCRIPTION OF THE DRAWINGS

In the following, the invention will be described in detail, with reference to exemplifying embodiments of the invention and to the enclosed drawings, wherein.

DESCRIPTION OF THE EMBODIMENTS

Figure 1:
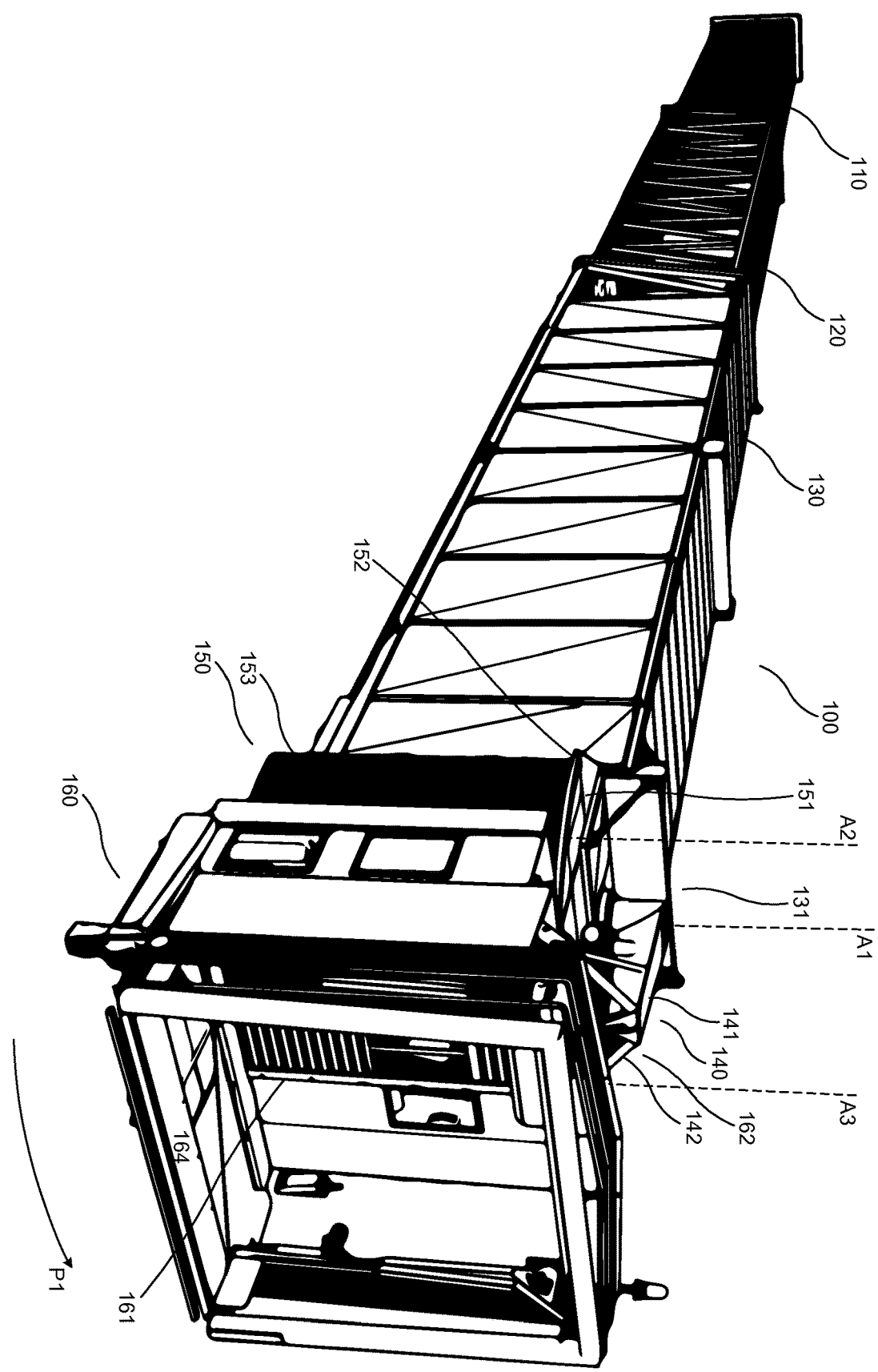
FIG. 1 is a perspective view of a passenger bridge according to the present invention.
Figure 2:
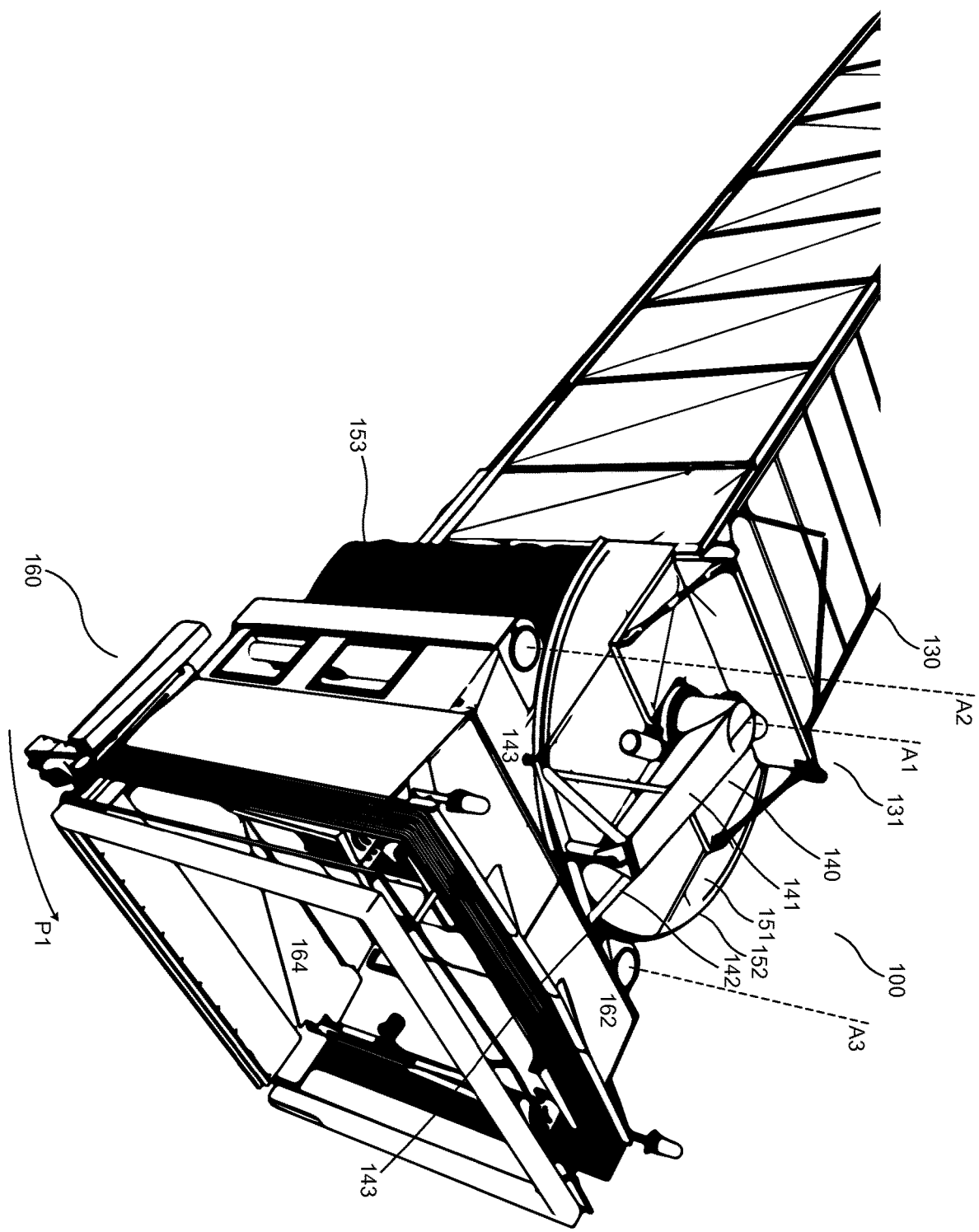
FIG. 2 is a detail perspective view of a bridge head of the passenger bridge illustrated in FIG. 1.
Figure 3:
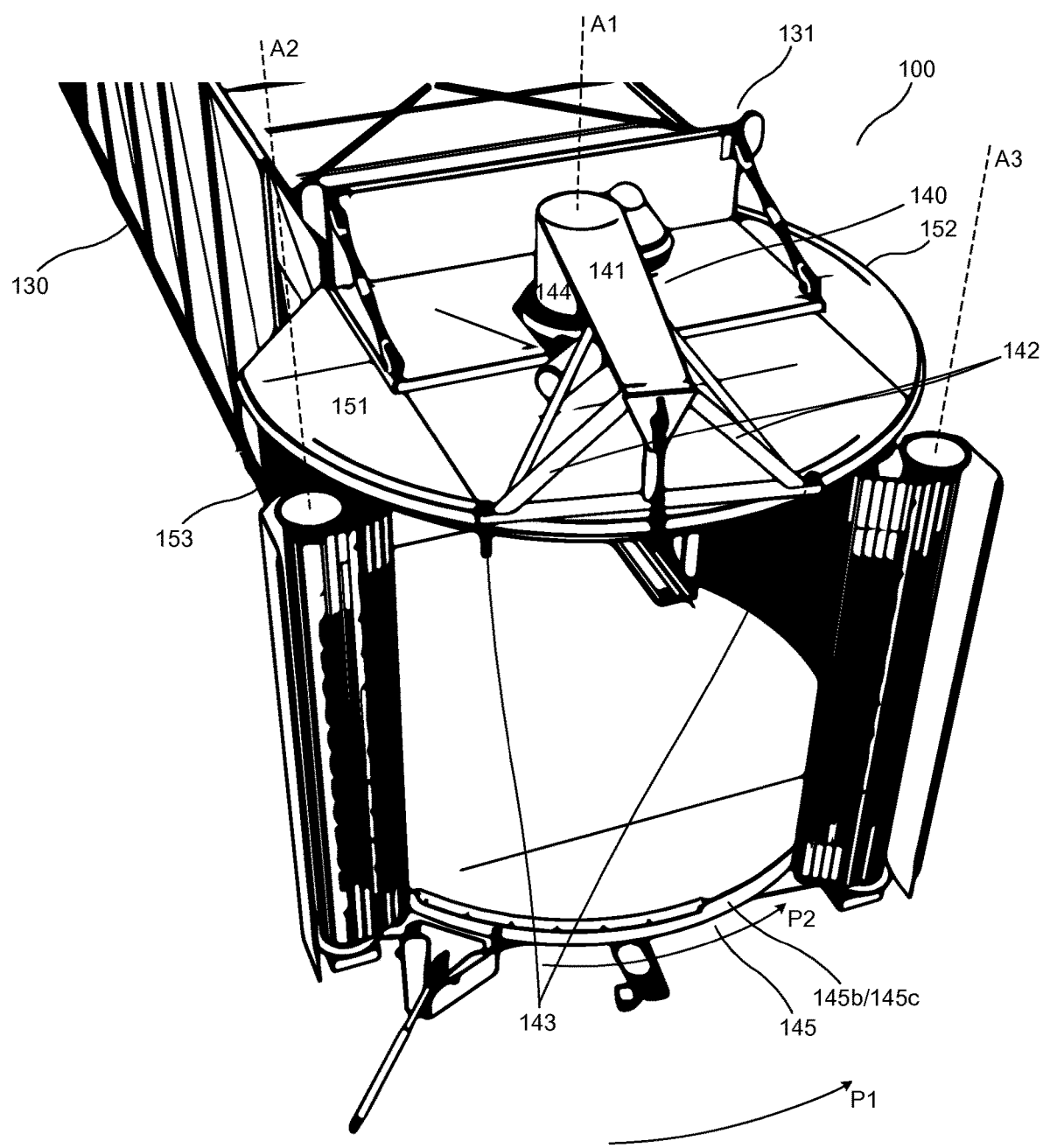
FIG. 3 is a partly removed detail perspective view of a bridge head of the passenger bridge illustrated in FIG. 1, with the cabin removed.
Figure 4:
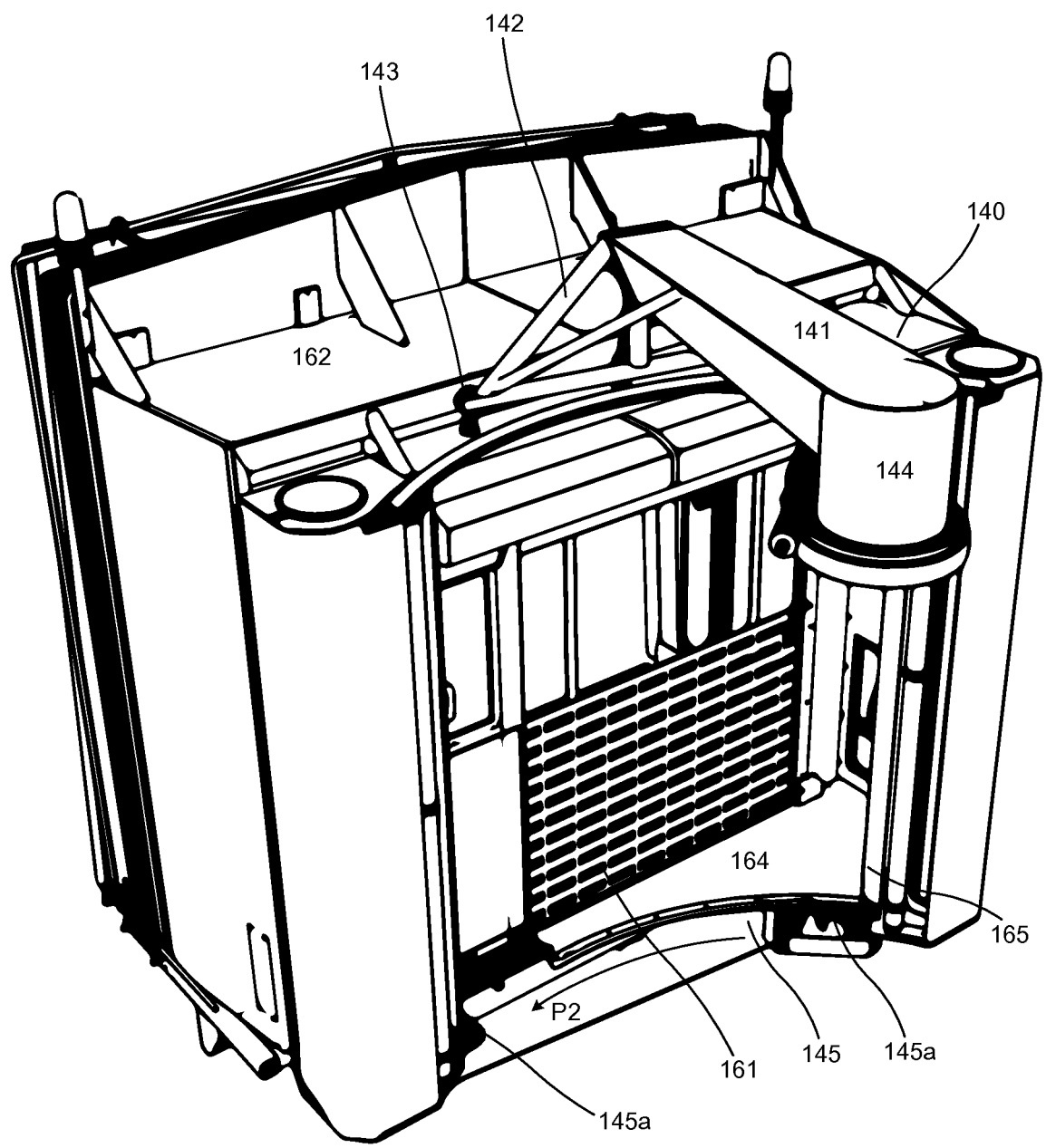
FIG. 4 is a partly removed detail perspective view of a cabin of the passenger bridge illustrated in FIG. 1, as seen from the opposite side as compared to FIG. 3 and with the rest of the bridge head, apart from the cabin removed.
Figure 5:
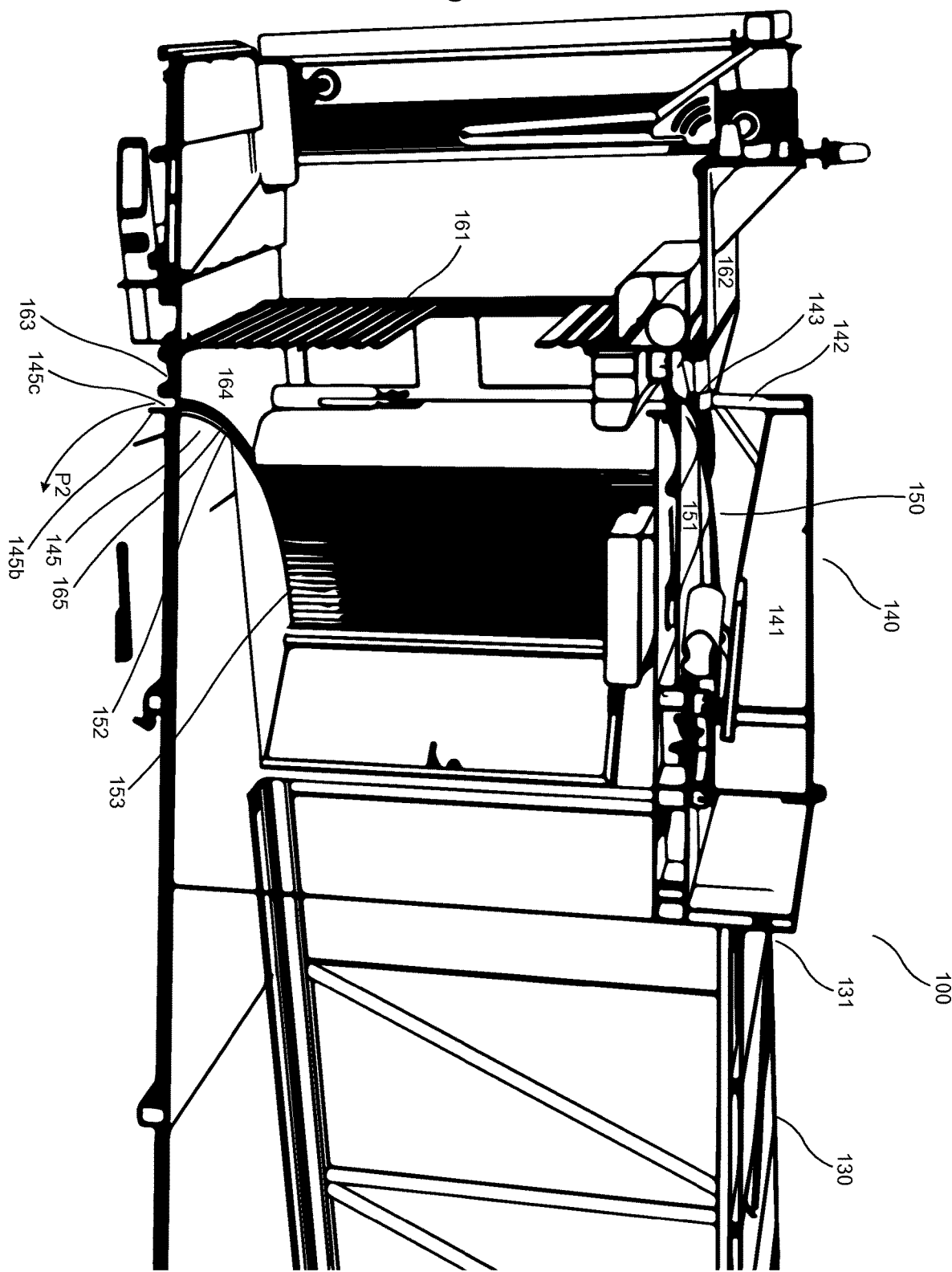
FIG. 5 is a vertical cross-section view of the bridge head illustrated in FIG. 2.
Figure 6:
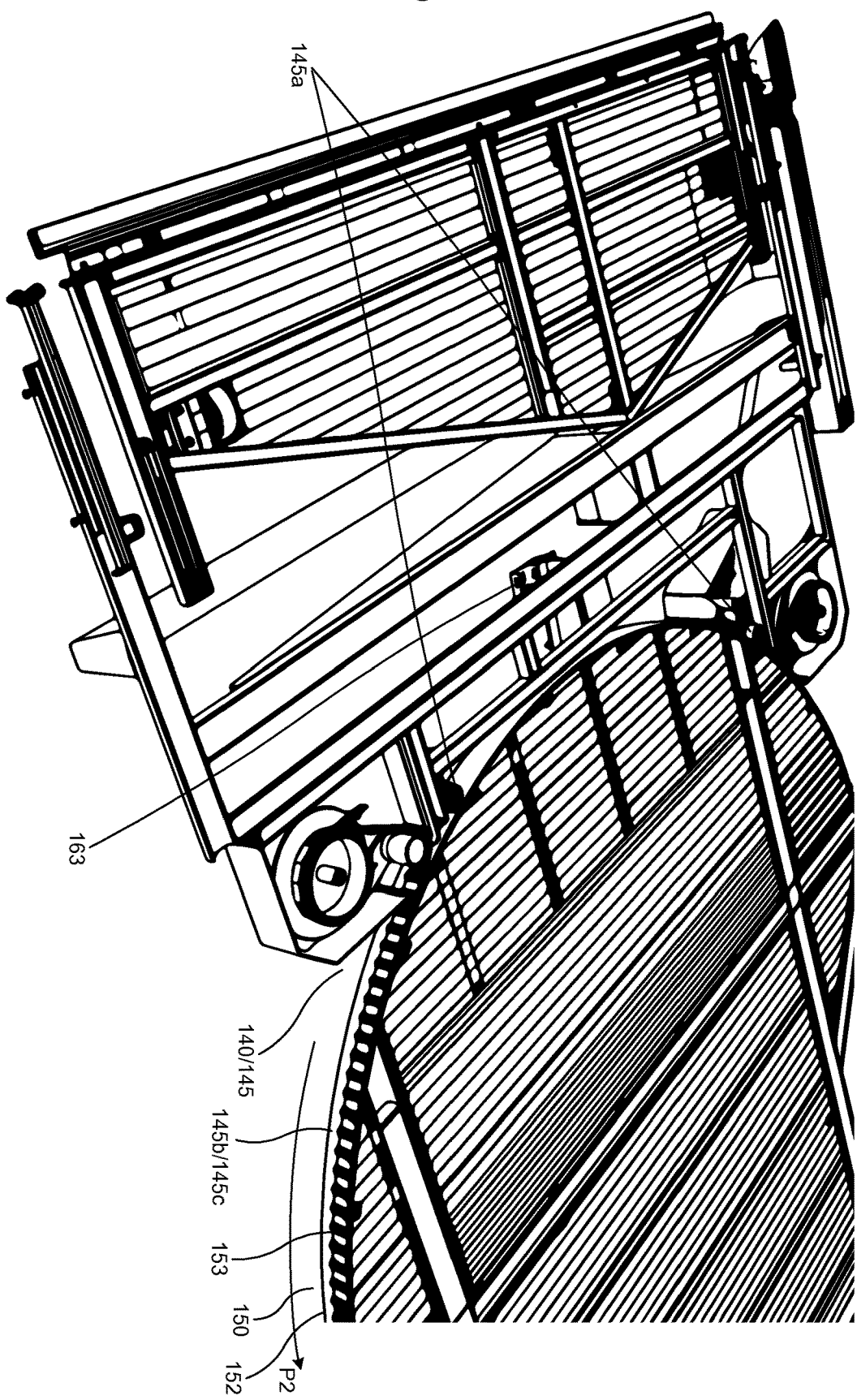
FIG. 6 is a horizontal cross-section view of the bridge head illustrated in FIG. 2.
Figure 7:
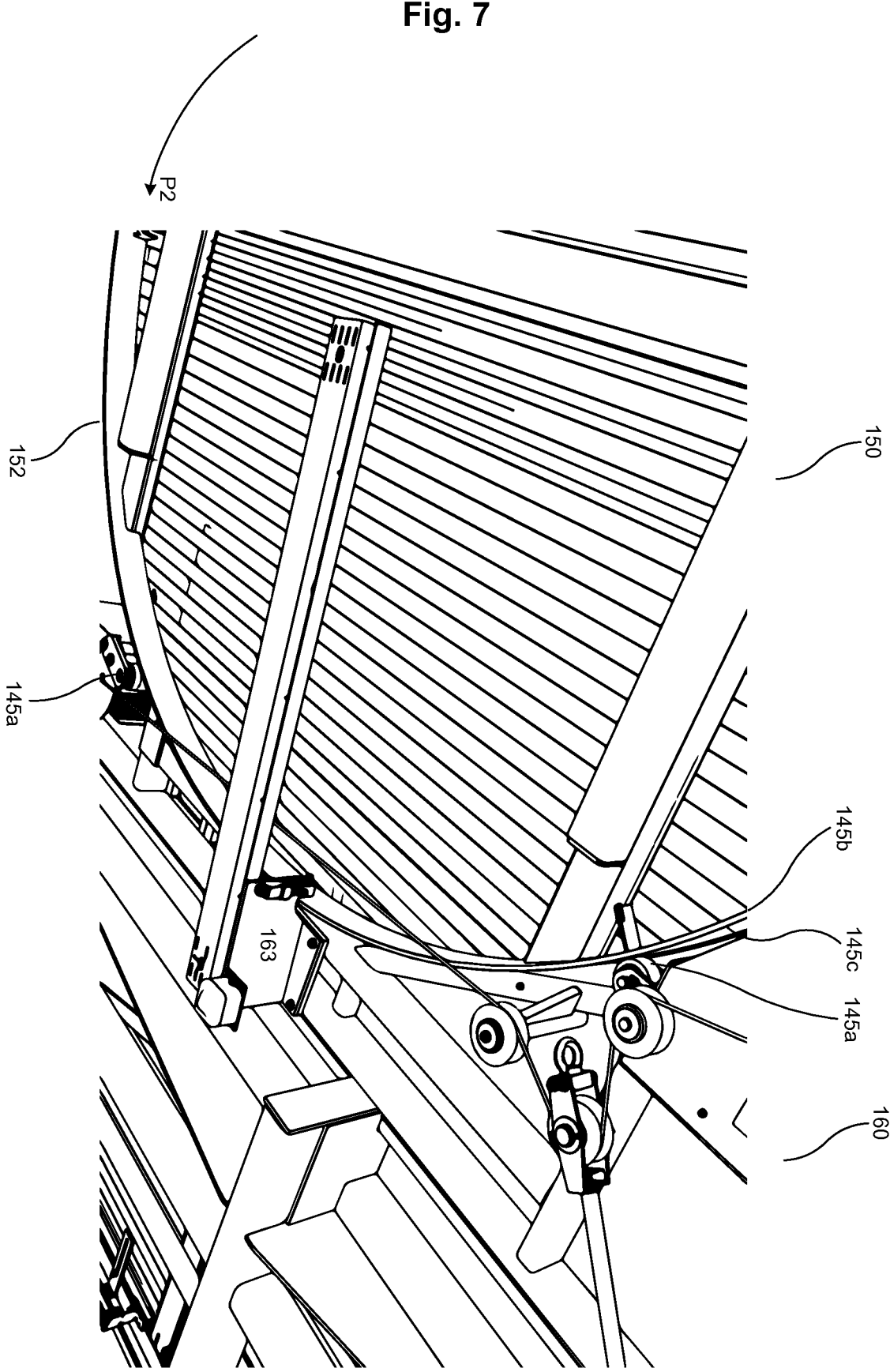
FIG. 7 is a bottom perspective view illustrating a lower part of a suspension system.

All figures share the same set of reference numerals and are generally drawn to scale to show a particular exemplifying, preferred embodiment of the present invention.

Hence, FIG. 1 illustrates a passenger bridge 100 according to the present invention. The passenger bridge 100 is preferably intended and arranged for taking walking passengers to and from a door opening in the hull of a ship, but may also be used for other purposes, such as taking passengers to and from an airplane.

In general, the passenger bridge 100 comprises at least one passenger bridge segment 110, 120, 130. In the Figures, three such segments 110, 120, 130 are shown. Preferably, the passenger bridge comprises at least two such segments. Preferably, the segments 110, 120, 130 are telescopically arranged in relation to each other, with a largest cross section segments 110 arranged at a first end of the passenger bridge 100 and a smallest cross section segment 130, also denoted "bridge end segment", arranged at a second, distal end of the passenger bridge 100. During use, passengers may move through the segments 110, 120, 130 in order, on their way to and from a bridge head 150 which is also comprised in the passenger bridge 100 and via which passengers can move into and out from the bridge 100, from or to a ship or the like.

Hence, the bridge head 150 is arranged at, and connected to, a distal end 131 of the bridge end segment 130.

Moreover, the bridge head 150 in turn comprises a cabin 160 with an entry/exit door 161 for passengers. The cabin 160 is arranged to move about an outer periphery 152 of the bridge head 150, and comprises an entry/exit door 161 for passengers. Hence, the cabin 160 and its door 161 can move along said outer periphery 152 of the bridge head 150, allowing the passenger bridge 100 to cater for passenger transfer in selectable horizontal directions, by turning the cabin 160.

Furthermore, the passenger bridge 100 comprises a cabin suspension 140, arranged to allow the cabin 160 to rotate in relation to the bridge head 150 about a vertical axis V1, in a horizontal swing plane P1. Such rotation is preferably possible across an angular interval of at least 45°, preferably at least 90°, and furthermore of at the most 270°, preferably at the most 180°. Hence, as the term is used in this context, that the cabin 160 is arranged to "rotate" in relation to the bridge head 150 does not imply full 360° rotations, but a rotary motion across a more limited angular interval.

Hence, the suspension 140 is arranged to drive the cabin 160 in such rotary movement. This drive is controlled by a control device (not shown in the Figures), allowing an operator to manually or automatically direct the cabin 160 door 161 in a desired horizontal direction depending on operating conditions. The control device can preferably control this horizontal angle over a continuous spectrum of angles, as opposed to control the angle to a limited number of discreet angular positions.

According to the invention, the cabin 160 suspension 140 comprises a pivot arm 141 in journaled engagement with an upper part 151 of the bridge head 150 so that the cabin 160 can swing in a horizontal plane, about the said bridge head 150 periphery 152. Preferably, the periphery 152 is substantially cylindrical with a horizontal cross section (in relation to an imagined vertical envelope surface), preferably substantially semi-circular cylindrical, so that the rotating movement of the cabin 160 about the bridge head 150 follows a semicircular path in a horizontal plane.

Further according to the invention, a cabin holding part 142 of the pivot arm 141 is fastened to an upper part 162 of the cabin 160, whereby the cabin 160 hangs from the said cabin holding part 14. Preferably, the fastening point is arranged on a roof of the cabin 160.

Having a rotary suspension of the above described type, and in particular of the more detailed type described below, has proven to provide a very robust and reliable operation of the passenger bridge. Performance is adequate in all weathers, even under heavy wind, without requiring unreasonable material thicknesses in the construction. The lack of belt or chain drives reduces maintenance burden. In particular, the most heavily loaded moving part (the journaled engagement between the pivot arm 141 and the bridge head 150) can be enclosed using suitable casing for weather protection. The minimization of moving parts reduces the risk of metal fatigue problems, ultimately leading to breaking and failure. Also, the lack of mechanical driving and suspension components beneath the cabin 160 makes installation and use of peripheral equipment, such as power supply devices, air conditioners and the like, for delivering various services to a ship or similar, easy. Namely, such equipment is often installed under the cabin 160 for each access and connection to the ship or similar.

According to a preferred embodiment, illustrated in the Figures, the cabin 160 is furthermore horizontally supported by the bridge head 150 by a horizontal support means 145, which horizontal support means 145 is arranged to allow the bridge head 150 and the cabin 160 to engage in a horizontally displaceable manner along an engagement path arranged in a horizontal engagement plane P2. The horizontal engagement plane P2 is arranged below the below-described fastening points 143 between the pivot arm 141 and the cabin 160, preferably at least 2 meters, preferably at least 3 meters, below the fastening points 143 as measured in the vertical direction.

Hence, the pivot arm 141 holds the cabin 160 by exerting a substantially vertical upwards force to the cabin 160, while the cabin 160 is kept in place horizontally using said horizontal engagement means 145. It is preferred that the cabin 160 is so balanced, in relation to an application point of said force from said pivot arm 141, so that it presses against the cabin head 150 periphery with a certain relatively small but non-negligible force, such as between 10 00 and 100 000 N. Hence, the application point of said force is in general preferably not arranged along the same vertical axis as a mass centre of the cabin 160, but away from such a mass centre and towards the bridge head 150.

In particular, it is preferred that the said horizontal engagement plane H2 is arranged below an interior floor 164 of the cabin 160. In other words, an engagement path of said horizontal engagement means 145 lies entirely below said floor 164 in all rotary positions of the cabin 160 in relation to the bridge head 150.

It is furthermore preferred that the horizontal support means 145 is arranged to apply a purely horizontal, or at least substantially horizontal, force, directed away from the bridge head 150, to the cabin 160, and in particular so that the cabin 160 is not vertically supported by said horizontal support means 145.

It is realized that the contrary would also be possible, although less preferred, namely that the application point of said force is arranged so that a lower part of the cabin 160 is pressed away from the bridge head 150 as a result of the mass balancing of the cabin 160, and in that the horizontal support means 145 is designed so as to impart a force onto a lower part of the cabin 160 which is directed towards the bridge head 150. In this case, the below-described wheels 145*a* could, for instance, act on an interior vertical face of the below-described flange 145*b*, in effect holding the lower part of the cabin 160 in place close to the bridge head 150.

It is generally preferred that the cabin 160 is supported only using said pivot arm 141 and said horizontal support means 145. Hence, it is preferred that no other structural elements are present providing vertical or horizontal support for the cabin 160 in relation to the bridge head 150. Then, the cabin 160 is rotary suspended in the vertical direction using the pivot arm 141, while its horizontal position along the bridge head 150 periphery 152 is secured by the horizontal support means 145.

In particular, it is preferred that the cabin 160 is not supported by wheels rolling along a horizontal surface.

According to the preferred embodiment of the horizontal support means 145 illustrated in the Figures, the horizontal support means 145 comprises at least two wheels 145*a* arranged to roll along a semi-circular support surface 145*c*. in the Figures, the preferred design that the wheels 145*a* are rigidly fastened to the cabin 160 and the support surface 145*c* is rigidly fastened to the bridge head 150 is illustrated; however, it is realized that the opposite is also possible, so that the wheels 145*a* are rigidly fastened to the bridge head 150 and the support surface 145*c* is rigidly fastened to the cabin 160. The support surface 145*c* is preferably vertical, or at least substantially vertical, and the wheels 145*a* hence preferably rotate about a respective axis which is vertical or at least substantially vertical.

In a very preferred embodiment, the semi-circular support surface 145*c* is arranged as an outer surface of a curved flange 145*b*, and either the bridge head 150 or the cabin 160 comprises a number of hooking means 163, which hooking means 163 are arranged to engage with a back side of said curved flange 145*b*. Preferably, the flange 145*c* is arranged on the bridge head 150, and preferably extends along the whole peripheral section of the bridge head 150 along which the cabin 160 can move. Further preferably, the wheels 145*a* are mounted on the cabin 160 and are preferably arranged to roll along the support surface 145*c* formed by an exterior side of the flange 145*b*. It is preferred that the flange 145*b* is vertical, or at least substantially vertical.

Preferably, the hooking means 163 are in the form of rigid hooks, such as welded metal hooks or hook-like structures. Further preferably, they are arranged to engage with the flange 145b, when the cabin 160 is suspended in a normal operating orientation in which the cabin 160 is vertically, uprightly oriented, with the interior cabin floor 164 horizontal or substantially horizontal, with a certain play, preferably so that there is a horizontal distance of between 1 and 20 cm between each hooking means 163 and the flange 145b. Thereby, the cabin 160 is prevented from swinging more than a predetermined angle in a vertical plane from said normal operating orientation, while it can rotate without any added friction from the hook means 163. This way, full security may be offered during harsh weather conditions while still not deteriorating performance during use in normal conditions.

In one preferred embodiment, the bridge head 150 comprises horizontally extendable, vertical jalousi walls 153, that are rolled up on, or out from, vertically arranged rolls as the cabin 160 turns about said vertical axis A1. As a result, the parts of the bridge head 150 periphery 152 not occupied by the cabin 160 are always covered by the jalousi walls 153, while an internal opening 165 between the bridge head 150 and the cabin 160 is not covered by the jalousi walls 153. Then, it is preferred that the jalousi walls 153 extend vertically downwards to a vertical level below the horizontal engagement plane P2, in other words at least down to a vertical position at which the wheels 145a abut the flange 145b. Furthermore, it is then preferred that the jalousi walls 153 extend in the same curved space that the wheels 145a occupy when the cabin 160 turns along the bridge head 150 periphery. However, the wheels 145a are then preferably both arranged along the horizontal section of the cabin 160 periphery occupied by the internal opening 165, so that, as the cabin 160 turns, the wheels 145a will always be arranged in said non-occupied opening 165 between the bridge head 150 and the cabin 160. If this was not the case, the wheels 145a and the jalousi walls 153 would occupy the same space. This provides a robust yet simple solution.

In particular, there are preferably two or maximally three wheels 145a, all arranged along said internal opening 165 between the bridge head 150 and the cabin 160. The wheel pair arranged furthest apart are preferably at least 2 meters, but preferably at the most at the most 5 meters, apart. It is noted that, correspondingly, the internal opening 165 is preferably at least as wide, in a horizontal direction, as the distance between said wheel pair.

According to a preferred embodiment, the pivot arm 141 is fastened at two different fastening points 143 to the cabin 160, which fastening points 143 are arranged at least 1 meters apart horizontally. Preferably, there are only two, or maximally three, such fastening points 143. Further preferably, the two, or possibly three, fastening points 143 constitute the only rigid supporting mechanical connection between the pivot arm 141 and the cabin 160. The pivot arm 141 preferably comprises two or more forked beams, each one arriving at a particular fastening point 143. This reduces wobbling under windy operating conditions.

Further preferably, the passenger bridge 100 further comprises a motor 144 for rotary driving the cabin 160 about said vertical axis A1. The motor 144 is fixedly mounted on the bridge head 150. It is further preferred that a main drive axis of the motor coincides with the said vertical axis A1. The term "main drive axis" refers to an axis to which the driving moment of the motor 144 is applied, either directly by the motor 144 or via one or several gears or gear wheels, as applicable. What is important is that the motor 144, together with any gearbox or the like, is arranged to provide the rotating moment driving the cabin 160 directly at the pivot point of the pivot arm 141, as opposed to via a belt- or chain drive, a hydraulic system, or other power transfer system using a flexible and/or elongated power transfer means.

Further preferably, the cabin 160 is not driven in a horizontal rotary direction by any other driving means than said motor 144. This is a particularly simple yet robust construction.

In particular, the motor 144, which as described above may comprise a gear box, is arranged to engage with the pivot arm 141 in such a way so that when the motor 144 does not drive the cabin 160 for rotary motion an internal friction of the motor 144 prevents the cabin 160 from rotating about said vertical axis A1. In other words, the internal friction presents a force counteracting a non-driven motion of the cabin 160 about said vertical axis A1. In practise, this may be accomplished by a self-locking motor 144 and/or gearbox, such as is well-known in the art as such.

The gearbox may comprise a worm gear, and may provide at least two different selectable motor speeds.

At the upper part of the cabin 160, which runs along a corresponding upper part of the bridge head 150 as the cabin 160 rotates, there is preferably a certain play, of at least 5 cm and at the most 50 cm. This play is defined by the length of the pivot arm 141. Hence, there is preferably no direct mechanical contact between the cabin 160 upper part and the bridge head 150 upper part.

Above, preferred embodiments have been described. However, it is apparent to the skilled person that many modifications can be made to the disclosed embodiments without departing from the basic idea of the invention.

For instance, the passenger bridge 100 may comprise more or fewer sections 110, 120, 130 than the ones shown in the Figures.

Moreover, the bridge head 150 and the cabin 160 may be designed in other ways than what is illustrated in the Figures, as long as the above described principles are respected. For instance, the cabin 160 may be arranged with an entry/exit opening which is narrower, wider, taller or lower than illustrated. It may also be arranged with one or several foldable passenger gangways, an external roof, and so forth.

The cabin 160 may be movable along the bridge head 150 periphery 152 along a path which is not semi-circular, but which has a more complex shape, such as stepwise circular or even elliptical or other curved shapes. Such more complex shape could be realized by the vertical axis A1 being movable, for instance using a link arm system at the point of connection between the pivot arm 141 and the bridge head 150; by the pivot arm 141 being telescopically extendable; or similar.

The bridge head 150 may be supported on the ground using a support leg, which may be telescopic so as to allow vertical adjustment of the cabin 160 door 161.

Hence, the invention is not limited to the described embodiments, but can be varied within the scope of the enclosed claims.

The invention claimed is:
1. A passenger bridge comprising:
a passenger bridge end segment;
a bridge head, arranged at a distal end of said bridge end segment;
a cabin, arranged to move about an outer periphery of the bridge head and comprising a door for passengers;

a cabin suspension, arranged to allow the cabin to rotate in relation to the bridge head about a vertical axis (A1); and a motor for rotary driving the cabin about said vertical axis, wherein a main drive axis of the motor coincides with the vertical axis, wherein the cabin suspension comprises a pivot arm in journaled engagement with an upper part of the bridge head so that the cabin can swing in a first horizontal plane (P1), and wherein a cabin holding part of the pivot arm is fastened to an upper part of the cabin, whereby the cabin hangs from the said cabin holding part, and wherein the cabin is horizontally supported by the bridge head by a horizontal support means, which horizontal support means is arranged to allow the bridge head and the cabin to engage in a horizontally displaceable manner along an engagement path arranged in a horizontal engagement plane (P2), but which horizontal support means does not vertically support the cabin.

2. The passenger bridge according to claim 1, wherein the cabin is not driven in a horizontal rotary direction by any other driving means than said motor.

3. The passenger bridge according to claim 1, wherein the horizontal engagement plane (P2) is arranged beneath an interior floor of the cabin.

4. The passenger bridge according to claim 1, wherein the motor, which may comprise a gear box, is arranged to engage with the pivot arm in such a way so that when the motor does not drive the cabin for rotary motion, an internal friction of the motor prevents the cabin from rotating about said vertical axis (A1).

5. The passenger bridge according to claim 1, wherein the cabin is supported only using said pivot arm and said horizontal support means.

6. The passenger bridge according to claim 1, wherein the horizontal support means comprises at least two wheels arranged to roll along a support surface.

7. The passenger bridge according to claim 6, wherein the support surface is arranged as an outer surface of a curved flange, and in that either the cabin or the bridge head comprises a number of hooking means, arranged to engage with a back side of said curved flange with a play, whereby the cabin is prevented from swinging more than a predetermined angle in a vertical plane.

8. The passenger bridge according to claim 1, wherein the pivot arm is fastened at two different fastening points to the cabin, which fastening points are arranged at least 1 meters apart.

9. The passenger bridge according claim 8, wherein the said two fastening points constitute the only rigid supporting mechanical connection between the pivot arm and the cabin.

* * * * *